US008418965B2

(12) United States Patent  
Schnitzer

(10) Patent No.: US 8,418,965 B2
(45) Date of Patent: Apr. 16, 2013

(54) MOUNTING SET, SYSTEM AND METHOD

(75) Inventor: Israel Schnitzer, Tel Aviv (IL)

(73) Assignee: Israel Aerospace Industries Ltd., Lod (IL)

( * ) Notice: Subject to any disclaimer, the term of this patent is extended or adjusted under 35 U.S.C. 154(b) by 78 days.

(21) Appl. No.: 12/457,120

(22) Filed: Jun. 1, 2009

(65) Prior Publication Data

US 2010/0301159 A1 Dec. 2, 2010

(51) Int. Cl.
*B64D 1/12* (2006.01)

(52) U.S. Cl.
USPC ........................................ 244/137.4; 89/1.51

(58) Field of Classification Search ............... 244/137.1, 244/137.4; 89/1.51, 1.53, 154; 294/82.24, 294/82.26

See application file for complete search history.

(56) References Cited

U.S. PATENT DOCUMENTS

| | | | |
|---|---|---|---|
| 2,393,105 A | | 1/1946 | Hasselhorn |
| 2,826,119 A | * | 3/1958 | Barrowman ................ 89/1.51 |
| 3,077,818 A | * | 2/1963 | Rhodes, Jr. ................ 89/1.51 |
| 3,224,334 A | * | 12/1965 | Curtis et al. ................ 89/1.51 |
| 4,412,475 A | | 11/1983 | Hornby |
| 4,736,669 A | | 4/1988 | Long et al. |
| 4,829,876 A | | 5/1989 | Witt |
| 4,949,889 A | | 8/1990 | Carson |
| 5,906,302 A | | 5/1999 | Spergel |
| 6,053,533 A | | 4/2000 | Osborn et al. |
| 6,059,252 A | | 5/2000 | Emmann et al. |
| 6,547,182 B2 | | 4/2003 | Gladstone et al. |
| 7,100,873 B2 | | 9/2006 | Moates |

OTHER PUBLICATIONS

Jaffe, Greg, "Air Force seeks a bomb with less bang", Apr. 6, 2006, The Wall Street Journal.*
Choi, Y.C., et al., "Mission and System Design of Air-Launching Rocket Using Multidisciplinary Optimization Approach", 47th AIAA/ASME/ASCE/AHS/ASC Structures, Structural Dynamics, and Materials Conference, 8 pages, May 1-4, 2006, Newport, Rhode Island, American Institute of Aeronautics and Astronautics Inc.
Sarigul-Klijn, M., et al., "Flight Testing of a Gravity Air Launch Method to Enable Responsive Space Access", AIAA Space 2007 Conference & Exposition, 3 pages, Sep. 18-20, 2007, Long Beach, California, American Institute of Aeronautics and Astronautics Inc.
Chen, T. T., et al., "Responsive Air Launch Using F-15 Global Strike Eagle", 4th Responsive Space Conference, 10 pages, Apr. 24-27, 2006, Los Angeles, California, AIAA—4th Responsive Space Conference 2006.

* cited by examiner

*Primary Examiner* — Tien Dinh
*Assistant Examiner* — Jamie S Stehle
(74) *Attorney, Agent, or Firm* — Vorys, Sater, Seymour and Pease LLP; Susanne M. Hopkins; William L. Klima

(57) ABSTRACT

A mounting set for use in mounting an external stores to a mounting station of an aerospace vehicle includes a mounting bracket arrangement and a strap arrangement. The bracket arrangement is configured for selective reversible engagement with respect to the mounting station and for cooperating with the strap arrangement. The strap arrangement is configured for securing the bracket arrangement to the stores in load bearing abutment therewith to enable transfer of loads between the stores and the mounting station via said bracket arrangement, in operation of said mounting set. A mounting system is also provided for mounting an external stores to an aerospace vehicle having two or more mounting stations, including a mounting set for each mounting station. Mounting methods are also provided.

33 Claims, 9 Drawing Sheets

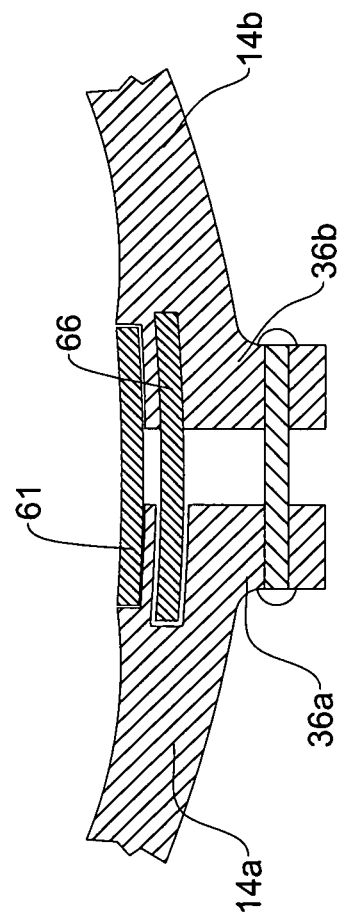
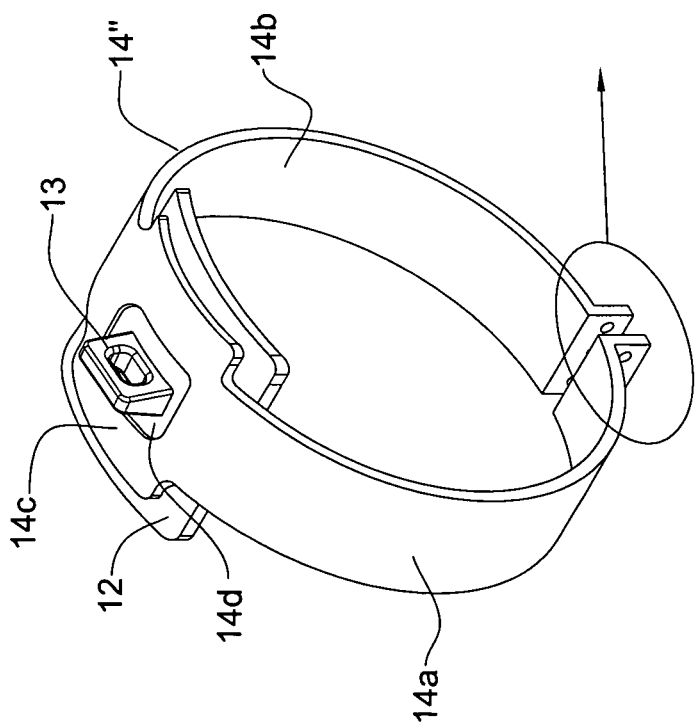
FIG. 8
FIG. 8(a)

MOUNTING SET, SYSTEM AND METHOD

FIELD OF THE INVENTION

This invention relates to stores carried on dynamic platforms, in particular rocket propelled missiles and the like carried on air/space vehicles.

BACKGROUND OF THE INVENTION

There are a variety of different systems for carrying stores on a dynamic platform such as an aerospace vehicle, and for deploying the stores therefrom. In one commonly used system, the stores are releasably mounted to mounting stations of aircraft, space vehicles and the like by means of lugs integrally formed or permanently fixed on the stores, either externally on pylons, or within a bomb bay or the like, and the lugs may be releasably engaged with release shackles or the like on the carrier vehicle. The lugs are joined to the stores casing in a manner such as to enable it to stand the dynamic loads during operation of the vehicle, and the lugs are provided in the prior art as a unitary item with the stores, limiting use of the particular stores with a particular mounting station configuration. However, providing a metal lug joined to the casing may present difficulties when the casing is non-metallic and/or the casing is thin and/or is subject to significant expansion during operation of the stores. The latter may be the case, for example, when the stores comprises a rocket engine for propelling a payload, wherein engine experiences expansion during firing.

Examples of some known mounting systems are briefly discussed below.

In U.S. Pat. No. 6,547,182, a solid rocket motor used as a booster rocket for a launch vehicle is provided with a mounting structure that includes a raised hub to which the thrust pin is attached, a series of aft-directed struts and a pair of transverse struts, all terminating in separate plates for bolting to the rocket motor case U.S. Pat. No. 4,736,669 and U.S. Pat. No. 4,829,876 disclose a missile launcher having an elongate planar platform formed integral with the body of the launcher. Plural bomb rack fasteners and pylon mounting lugs are fixed to the platform surface to accommodate different aircraft types. Plural sway braces are removably fixed to the side edges of the platform surface. Each sway brace can be fixed to desired positions along the side edges of the platform surface to also accommodate different aircraft type mounting apparatus.

U.S. Pat. No. 4,412,475 discloses a jettisonable missile launcher pod has support lugs which extend upwardly through a relatively small separate hardback structure to latch into standard release hooks in an aircraft-mounted pylon. The hardback is adjustably attached to the pylon and contains the required high technology electronic gear for the missile system. When the pod is jettisoned, it drops from the release hooks as usual, but the electronic gear remains with the aircraft in the hardback.

AIAA-2006-1722 ("Mission and System design of Air Launching Rocket Using Multidisciplinary Optimization Approach") discloses an air launched rocket, which is carried on and deployed from the underside of a fuselage of a mother aircraft. RS4-2006-2001 ("Responsive Air Launch Using F-15 Global Strike Eagle", 4$^{th}$ Responsive Space Conference 2006, Los Angeles) discloses an air launched rocket, which is carried on and deployed from the back of a carrier aircraft. AIAA 2007-6146 ("Flight Testing of a Gravity Air Launch Method to Enable Responsive Space Access", AIAA Space 2007) discloses carrying a rocket in the cargo hold of a cargo aircraft, and deploying the same via the aft cargo doors: a drogue parachute is used for facilitating deployment of the rocket, after which the rocket may be fired once clear of the aircraft.

SUMMARY OF THE INVENTION

Herein, by "dynamic platform" is meant an artificial structure that in operation thereof is designed to be subjected to relatively high steady state accelerations, with respect to up to six degrees of freedom, for example as induced during transportation and maneuvering in air or in space. In some cases, such dynamic platforms may experience accelerations of up to ±5 g along a longitudinal axis of the platform, and up to ±10 g in directions orthogonal to this axis.

For example, such a dynamic platform may include aerospace vehicles.

Herein by "aerospace vehicle" is meant air vehicles or space vehicles, i.e., vehicles configured for operating in the atmosphere and/or in space, and capable of powered or unpowered flight therein, and may be manned or unmanned. Examples of such vehicles may include, inter alia, fixed wing aircraft, rotor wing aircraft, spacecraft, airships, aerostats, satellites, rocket launchers, booster rockets, and so on. Such vehicles are designed to operate in the atmosphere or outside thereof, when not in direct contact with the ground or sea other than, in some cases, a tether or the like, and thus are configured for operating in a fluid environment having a density substantially less than 1.22 kg/m$^3$, or in a vacuum.

Herein by "pressure vessel" is meant a vessel wherein in operation thereof the vessel may expand as a result of application of internal pressure thereto, the expansion being significant, and may include, for example, rocket engines and the like.

Herein by "stores" is meant any body that it is desired to mount to the dynamic platform, and may include, inter alia, rockets, missiles, and the like. In particular, external stores are stores which are designed for operating, including being mounted, with respect to an outside of the dynamic platform, particularly an aerospace vehicle, or stores which may be carried mounted to an internal part of the dynamic platform, particularly an aerospace vehicle, but in operation of the stores the stores may be deployed to an outside of the dynamic platform, particularly an aerospace vehicle.

According to one aspect of the invention, a mounting set is provided for mounting a stores to a mounting station.

According to this aspect of the invention, a mounting set is provided for use in mounting an external stores to a mounting station of an aerospace vehicle, comprising at least one strap configured for circumscribing at least a majority of a perimeter of an external surface of said stores in load bearing abutment therewith, and further comprising at least one mounting bracket configured for selective reversible engagement with respect to said mounting station and for transferring loads between the or each said straps and said mounting station. The external stores may be externally mounted or internally mounted to the aerospace vehicle.

According to this aspect of the invention, a mounting set is also provided for use in mounting a deployable stores to a mounting station of an aerospace vehicle, comprising at least one strap configured for circumscribing at least a majority of a perimeter of an external surface of said stores in load bearing abutment therewith, and further comprising at least one mounting bracket configured for selective reversible engagement with respect to said mounting station to enable corresponding deployment of said stores from said vehicle, and for transferring loads between the or each said straps and said mounting station. The mounting set may thus be utilized for externally or internally mounting a stores with respect to the aerospace vehicle or any other dynamic platform.

By externally mounting is meant that the stores is mounted to an external part of the dynamic platform, while by internally mounting is meant that the stores is mounted to an internal part of the dynamic platform, the internal part allowing deployment of the stores to an outside of the platform responsive to disengagement from the mounting station of the mounting system that includes the mounting set.

According to this aspect of the invention a mounting set is also provided for use in mounting an external stores to a mounting station of an aerospace vehicle, comprising a mounting bracket arrangement and a strap arrangement, said bracket arrangement configured for selective reversible engagement with respect to the mounting station and for cooperating with said strap arrangement, said strap arrangement being configured for securing the bracket arrangement to the stores in load bearing abutment therewith to enable transfer of loads between the stores and said mounting station via said bracket arrangement, in operation of said mounting set. The said strap arrangement may comprise at least one strap configured for circumscribing at least a portion of a perimeter of an external surface of the stores in abutment therewith. The bracket arrangement my comprise a mounting bracket configured for said selective reversible engagement with respect to the mounting station and a base portion configured for said load bearing abutment with the stores.

According to this aspect of the invention, each strap may be configured for substantial friction-free abutment with respect to said external surface. Commonly, the mounting bracket comprises an attachment lug configured for releasable engagement with a complementary hook member comprised at said mounting station.

The base may be in the form of a saddle member having a contact surface configured for abutting a part of said external surface, the or each bracket being joined to said saddle member. The contact surface may be configured for substantial frictional abutment with respect to said external surface. In some embodiments, the saddle member comprises at least one saddle flange for allowing overlying abutting connection of the or each said strap with respect therewith such as to sandwich each said saddle flange between said external surface and a corresponding overlying portion of the or each corresponding said strap during operation of said set. The overlying portion of the or each said strap is configured for substantial friction-free abutment with respect to the or each corresponding said saddle flange, and may comprise a coating or layer of a suitable friction minimizing material.

Each strap may comprise a strip of material having opposite ends, and further comprises a suitable connection arrangement configured for connecting said ends together such as to enable said strap to circumscribe said perimeter.

Optionally, the saddle member may comprise two axially spaced said saddle flanges and having said at least one bracket disposed therebetween, and further comprising two said straps, each said strap being in overlying relationship with a respective one of said saddle flanges.

Optionally, the saddle member may further comprise a primary thrust pad configured for cooperating with an ejection piston mechanism that may be comprised at the said mounting station during operation of said ejection piston mechanism. The primary thrust pad may be in the form of a secondary flange projecting from said saddle flange.

Optionally, the saddle member may further comprise a plurality of secondary thrust pads configured for cooperating with a sway brace mechanism that may be comprised at the said mounting station while said stores is mounted to said mounting station.

According to an aspect of the invention, each strap may be configured for elastically deforming to enable accommodation of a variation of said perimeter within a predetermined range while providing said load bearing abutment with the stores. Each strap may be configured for providing said load bearing abutment with the stores for a predetermined range of external loading to said stores via said mounting station, and to further allow said elastic deformation while maintaining said load bearing abutment with the stores. Each strap may be configured for providing said load bearing abutment with the stores for a predetermined range of thermal loading with respect to said stores, and to further allow said elastic deformation while maintaining said load bearing abutment with the stores. Each strap may comprise a modulus of elasticity such as to provide an elastic deformation of at least 0.8%, while providing a datum loading at an elastic deformation of at least 0.2%, said datum loading being sufficient to provide said load-bearing abutment at said range of external loads. The external loads may be between about 5 g and about 10 g.

When using a metal casing for the stores, the elastic deformation may be substantially less than 0.5%, for example between about 0.2% and about 0.3%, and the baseline tension may optionally be provided at a nominal strain of about 0.2%, for example.

By way of example the straps may be made from any one of: titanium alloys, including Ti-β alloys, Ti-15V-3Cr-3Al-3Sn; composite materials, including carbon fiber composites, Kevlar composites; superelastic alloys and/or shape memory alloys including Nitinol, CuZnAl, or CuAlNi alloys.

The mounting set may be particularly configured for a stores comprising a pressure vessel, such as for example a rocket motor.

The said stores may have a substantially circular or oval perimeter, or any other suitable shape.

According to this aspect of the invention, a mounting system is provided for mounting an external stores to an aerospace vehicle having at least two mounting stations, comprising for each said mounting station a mounting set as defined herein, each said set being mounted to said store at a location corresponding to the respective mounting station. Each said mounting station may comprise a release shackle arrangement for releasably engaging said bracket. In some embodiments, the mounting system comprises two said mounting sets, each said set comprising a pair of said straps axially displaced from one another.

An aerospace vehicle is also provided comprising at least one stores mounted thereto using a mounting system as defined herein. For example, such a vehicle may be a UAV. Optionally, at least one said stores is an external stores mounted to a wing or underbelly of said vehicle.

A method is also provided for mounting a stores to an aerospace vehicle mounting station, comprising:
  providing a mounting system as defined herein;
  engaging each said set with respect to said stores; and
  engaging each said mounting bracket to a respective said mounting station of said vehicle.

In step (b) said sets may be axially spaced from one another along a direction substantially orthogonal to said perimeter by a spacing substantially corresponding to a spacing between said mounting stations. Further in step (b), said straps may be in abutting load bearing contact wherein a baseline tension is provided on said straps, said baseline tension being sufficient for ensuring that said straps remain in abutting load bearing contact with said stores for a full range of operating conditions for said stores. Said baseline tension may be such as to enable the straps to be elongated elastically sufficiently to accommodate preset changes in ambient temperature and/or preset changes in said perimeter of said stores during operation thereof.

The method may further comprise the step (d) of selectively disengaging each said mounting bracket from its respective said mounting station to enable release of said stores.

Optionally, the stores may comprise a rocket motor, and the method further comprises the step of igniting said motor.

Optionally, the method may be applied to retrofitting a stores with at least one said mounting set for enabling the stores to be mounted to any desired aerospace vehicle, the or each mounting set being configured for engagement to a respective mounting station of said aerospace vehicle. Optionally stores does not previously comprise an integral mounting system for mounting the stores to an aerospace vehicle. Alternatively, the stores comprises an integral mounting system for mounting the stores to the aerospace vehicle or to another type of aerospace vehicle.

According to embodiments of the invention, a mounting system is provided comprising at least one mounting set for use in selectively mounting and deploying a stores with respect to a mounting station of an aerospace vehicle, the or each mounting set comprising a mounting bracket arrangement and a strap arrangement, said bracket arrangement configured for selective reversible engagement with respect to the mounting station and for cooperating with said strap arrangement, said strap arrangement being configured for securing the bracket arrangement to the stores in load bearing abutment therewith to enable transfer of loads between the stores and the mounting station via said bracket arrangement when said bracket arrangement is engaged with the mounting station, said bracket arrangement being selectively disengageable from the mounting station to enable corresponding deployment of said stores from said vehicle.

According to another aspect of the invention, a mounting set is provided for use in mounting a pressure vessel to a dynamic platform, the pressure vessel comprising a surface having a perimeter that is variable within a range during operation of said pressure vessel, the mounting set comprising at least one strap configured for circumscribing at least a majority of said external surface in a direction substantially parallel to said perimeter and in load bearing abutment with said external surface, and further comprising at least one mounting bracket configured for reversible engagement with respect to said dynamic platform and for transferring loads between the or said straps and said dynamic platform, the or each said straps being configured for providing support to said pressure vessel with respect to said dynamic platform while accommodating said variation of said perimeter within said range. The stores may be adapted for being deployed from the platform during operation of the stores.

The or each said at least one mounting bracket may be configured for reversible engagement with respect to a single mounting point comprised in said dynamic platform and for transferring loads between the or said straps and said mounting point.

A method is also provided for mounting a pressure vessel to dynamic platform, comprising:
(a) providing a plurality of mounting sets as defined herein;
(b) engaging each said set with respect to said external surface; and
(c) engaging each said mounting bracket to a respective mounting station of said dynamic platform.

Thus, according to at least some embodiments of the invention a mounting structure is provided that permits attachment of a rocket motor (or other expandable pressure vessel, mutatis mutandis) to a dynamic platform such as an aerospace vehicle, in a manner that accommodates the expansion of the rocket motor that occurs during operation thereof, and/or withstands the stresses associated with operating such a dynamic platform at aggressive g-loads in any direction, in a relatively simple and cost effective manner, and in a manner that may optionally be applied for retrofitting existing stores designs, whether the existing store design does not include any mounting arrangement, or whether the existing stores design already includes a mounting arrangement. Thus, the invention may be applied to a wide range of hardware that has no special provision for mounting to an aerospace vehicle or other suitable dynamic platform, and may be modified in a simple and cost effective manner to enable the same to be transported on the aerospace vehicle or dynamic platform in a similar manner to a standard external stores by matching the one or more mounting sets to the particular size, weight, expansion characteristics and so on of the hardware on the one hand, and the position of the mounting stations onto which it is to be mounted, on the other hand. The mounting sets do not normally require any modification of the hardware, except for example providing suitable rounded edges for applications where the straps of the mounting sets would otherwise need to be abutted over sharp edges, and thus the mounting sets may be removed from the hardware after use, as appropriate, without causing damage.

Referring to existing stores that already have integral mounting arrangements, it is to be noted that such arrangements are specific to one type of mounting station configuration. According to aspects of the invention, one or more mounting sets may be fastened to such stores to enable the stores to be used with any other mounting station configuration, part or all of the integral mounting arrangement then becoming redundant. In some cases it may be useful to simply add a mounting set according to embodiments of the invention to assist in supporting or in distributing load of such an existing stores.

The invention also provides a relatively simple and cost effective system and method of mounting a new stores which may be constructed from existing components of other stores, but where the weight and/or center of gravity may be different therefrom, allowing the mounting sets to be distributed in an appropriate manner with respect to the new stores to match the carrier vehicle arrangements According to an aspect of the invention, an attachment device for a rocket motor is provided, the attachment device comprising a saddle fastened with straps, the saddle comprising an interface for enabling attachment to a dynamic platform.

Some features of at least some embodiments of the invention include the following:—
  In normal operation, the stores may be disengaged from the dynamic platform without causing damage to the saddles or to the casing of the stores.
  Disengagement of a rocket-propelled type stores from the dynamic platform may be performed in steady flight conditions or even in extreme dynamic maneuvers, whether the rocket motor is fired prior to or after disengagement.
  In some embodiments comprising rocket propelled stores, these stores may be configured for being attached to the dynamic platform for most or all of the duration of firing of the rocket motor—for example for use in rocket assisted take-off for aircraft, or for use as auxiliary rockets for missiles etc.

The saddle member(s) may be attached to the external surface of the stores, such as a motor casing, for example, via the straps without any need for prior preparation of the stores, when the casing is a pressure vessel or otherwise does not include relatively sharp corners over which the straps are to abut.

The relative location of each mounting set, in particular the mounting bracket, i.e., the number of mounting sets and relative distance inbetween sets may be determined according to the interface requirements of the dynamic platform.

The mounting sets, in particular the mounting brackets may be positioned with respect to the stores such as to minimize dynamic load, such that the center of gravity of the stores is at the geometric center of suspension when two or more substantially similar mounting sets are used. When a single mounting set is used, this may be located aligned with the centre of gravity of the stores. Alternatively, when a number of mounting sets are used, each rated for taking a different proportion of the dynamic load associated with the stores, a weighted center of suspension may be calculated according to the distribution of dynamic load, and this weighted center of suspension and this may be located aligned with the centre of gravity of the stores.

A modular mounting system is provided, in which each mounting set acts as a module that may be used with any number of different vehicles, and with any number of different types of stores.

The mounting set allows the same stores, for example a particular rocket or missile, to be mounted to a variety of different dynamic platforms, for example different types of aircraft pylons, without requiring any particular modification to the stores itself: rather the relative locations of the mounting sets with respect to the stores may need to be changed for matching the pylon configuration of the different platforms.

No additional mounting elements are required for mounting the stores to the dynamic platform, and loads between the stores and the dynamic platform are transmitted via a relative large contact area between the straps and casing surface.

Using straps with high elasticity, low weight or density, and high tensile strength can enable the casing loading for the stores to be minimized.

The number of saddle member may be secured to the motor (each using one or a plurality of straps) may be determined according to the number and relative spacing of the mounting stations, i.e. the nature of the platform interface—there is also the flexibility of using in some cases less mounting sets than there are number of mounting stations, depending on the size of the stores, weight, and so on, for example;

It may be possible at least for some embodiments to control the level of fastening of the saddle member to the stores, and thus to match any intensity of the dynamic maneuver (within limits) that it is desired to subject the stores to, by varying the friction between the saddle member and the casing, and the baseline tension applied to the straps.

Suitable materials for the straps may be chosen to provide relatively high elasticity and tensile strength coupled with relatively low thermal expansion coefficient.

The straps may be configured as relatively thin flat strips, thereby minimizing drag when mounted to an aircraft, or when deployed therefrom.

The mounting sets, in particular the saddle member, may be configured for receiving a mechanical impulse from a pyrotechnic piston arrangement or the like, used for facilitating separation of the stores from an aircraft body in flight, thereby preventing possible damage to the stores casing and/or allowing a relatively stronger impulse to be provided.

The mounting sets, in particular the saddle member, may be configured for cooperating with sway braces, and different geometries of saddle members may be provided for cooperating with different sway brace geometries, for any particular stores.

The mounting sets are not generally sensitive to manufacturing tolerances, including diameter uniformity of the stores, and thus can lead in some cases to manufacturing cost reductions, where the stores may be manufactured to less stringent tolerances.

The mounting sets may also be used for mounting a stores internally in a dynamic platform. For example, in aircraft that are configured for accommodating stores such as missiles, bombs etc. in bomb bays or the like can have these stores mounted therein using the mounting sets.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 8 illustrates in top isometric view another variation of the mounting set embodiment of FIG. 1; FIG. 8(a) illustrates in cross-sectional view a detail marked in FIG. 8.

DETAILED DESCRIPTION OF EMBODIMENTS

Referring to FIGS. 1 to 4, a mounting system according to a first embodiment of the invention, generally designated 100, is provided for selectively and releasably engaging a stores 150 with respect to a dynamic platform 170.

Figure 1:
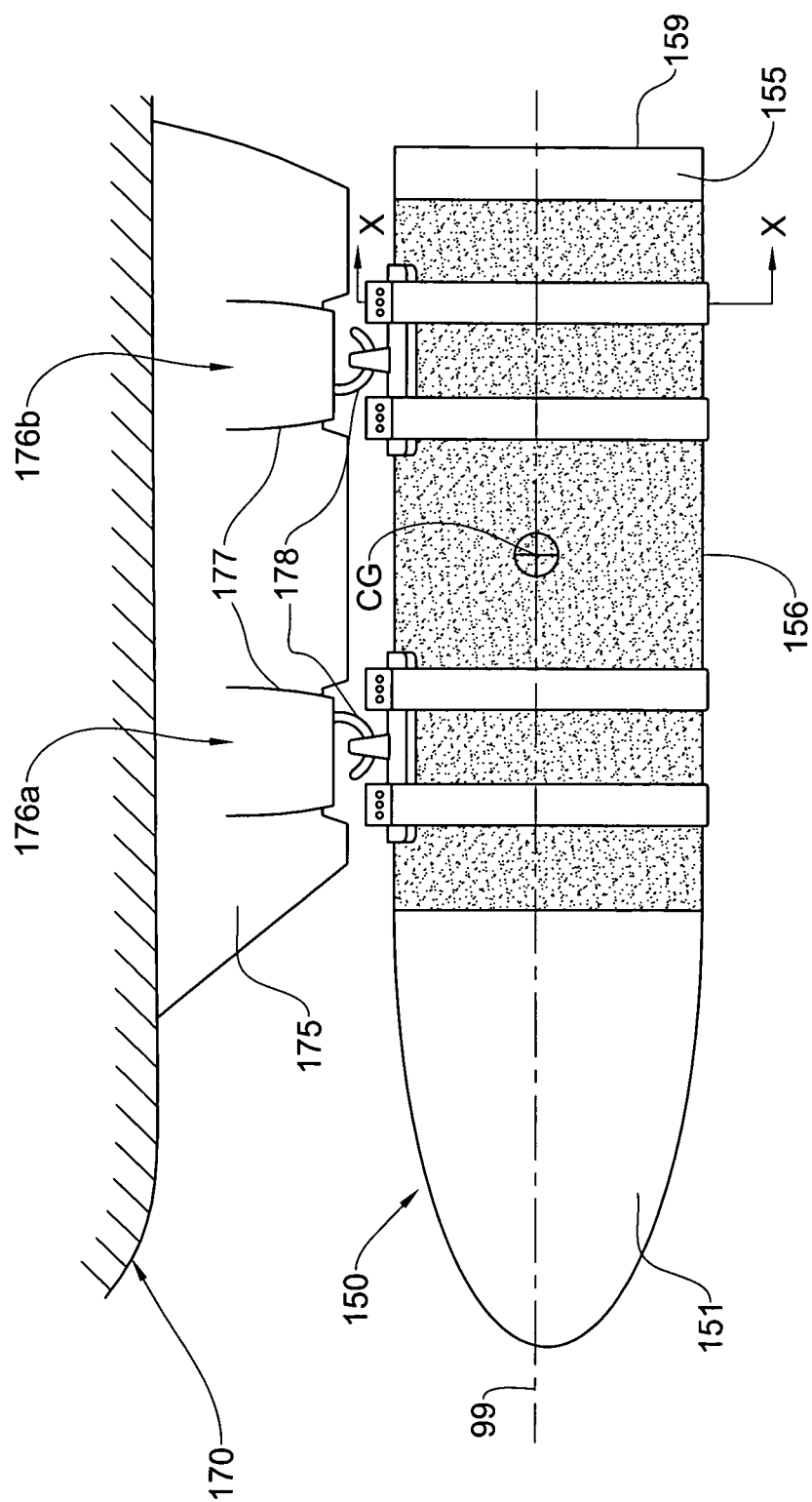
FIG. 1 is side view of a mounting system including mounting sets according to a first embodiment of the invention, used for mounting a stores to a vehicle.

In the first embodiment, and referring particularly to FIG. 1, the dynamic platform 170 comprises a carrier vehicle, in particular an aerospace vehicle, such as for example an aircraft, which may be a manned aircraft of an unmanned air vehicle (UAV), for example, though the invention may be applied, mutatis mutandis, to any other suitable dynamic platform. In this embodiment, the stores 150 may be mounted with respect to a standard mounting structure, or indeed to any other suitable mounting structure, provided in the dynamic platform. By way of example, the mounting structure is that of a standard wing pylon 175, comprising a pair of axially spaced mounting stations 176a, 176b, each station comprising a release shackle 177 having a hook 178 that cooperates to selectively engage/disengage with a hanger lug that is designed to be provided with an external store that it is desired to be mounted to the mounting station, enabling selective deployment of the stores with respect to the vehicle. Each mounting station commonly includes a pair of swing braces (not shown) in laterally spaced relationship with respect to the release shackle 177, for providing stability to the stores. Optionally, a release pyrotechnic piston (not shown) may also be provided for mechanically generating a separation impulse to the stores when this is released from the pylon to aid in distancing the stores therefrom. For example, common standard such mounting structures provide a pair of such hooks 178 axially separated from one another by a spacing of 14 inches for light stores, or by a spacing of 30 inches for heavy stores. However, the invention may be applied, mutatis mutandis, to any other suitable mounting structure.

By way of example, the stores 150 comprises a missile, rocket or the like, having an aft solid rocket engine 155, comprising a substantially cylindrical casing 156 defining a pressure vessel, accommodating a solid fuel propellant, and a nozzle 159 at the aft end. Alternatively, the stores may comprise a rocket engine using gaseous or liquid propellant. The casing 156 has an external surface 159, and a perimeter P taken in a direction substantially orthogonal to the longitudinal axis 99 of the stores 150. A payload 151, comprising for example explosives and/or guidance/targeting/surveillance systems, may be provided at the fore end of the stores 150. When the rocket engine 155 is fired, commonly but not exclusively after release and separation from the carrier aircraft, the casing 156 expands due to the thermal and pressure buildup in the combustion chamber of the rocket engine 155. Where the carrier vehicle is an aerospace vehicle, where there are weight considerations, casing 156 may in some embodiments comprise a relatively thin thickness, commonly of the order of 0.05 cm to about 2.5 cm, and such casings 156 may commonly expand in diameter between about 0.1% to about 0.6% for metallic casings, or between about 0.3% to about 1.8% for composite casings, depending on the particular configuration of the stores. While casing 156 is commonly tubular/cylindrical, having a circular perimeter, other embodiments of the invention are also applicable, mutatis mutandis, to other types of casings, for example frusto-conical or conical casings, casings having different diameters at different axial locations; casings having an oval or polygonal cross-section and perimeter, including a generally triangular or rectangular cross-section and perimeter.

Figure 2:
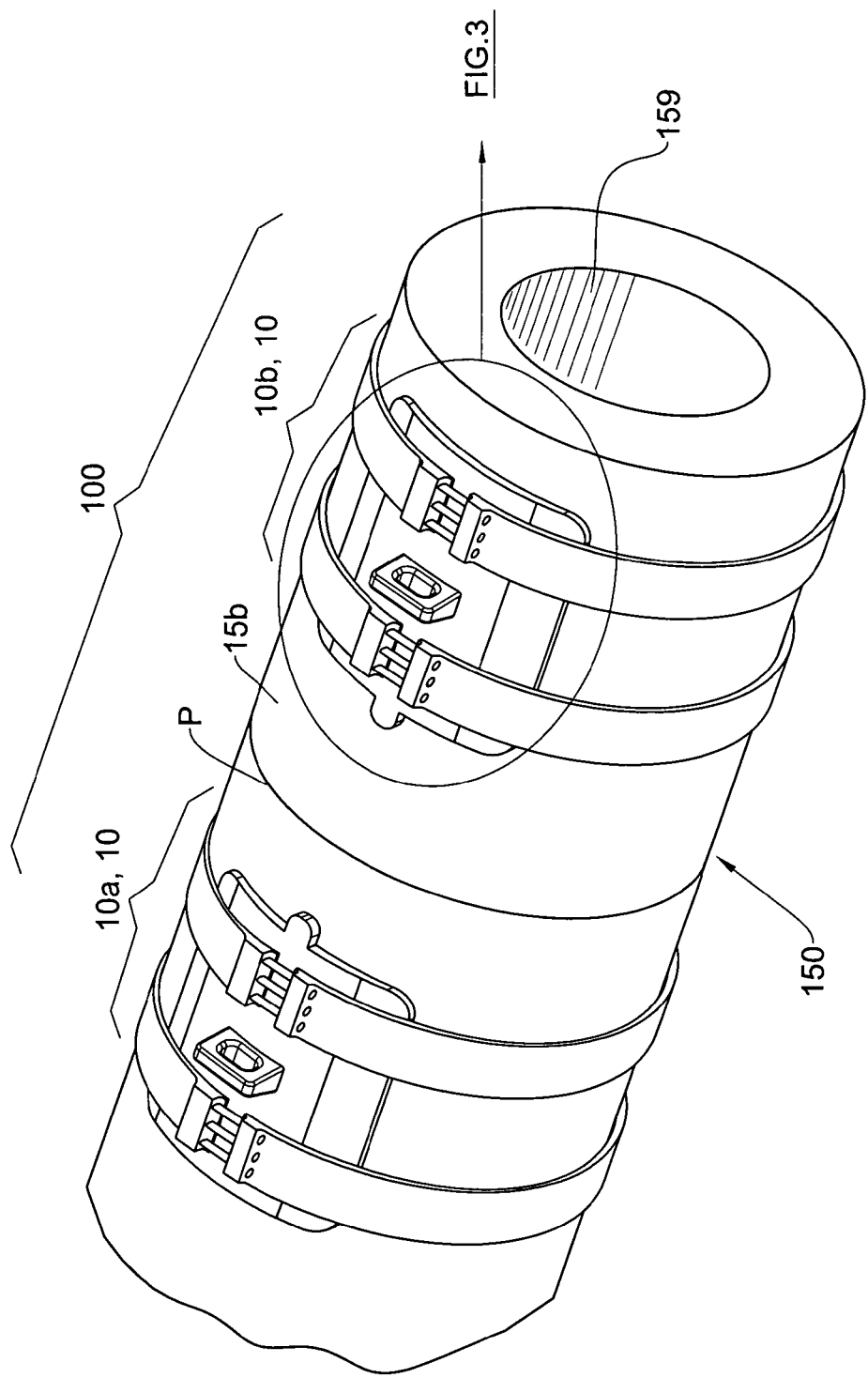
FIG. 2 is a top rear isometric view of the mounting system embodiment of FIG. 1 fastened to a stores.

Referring in particular to FIG. 2, the mounting system 100 comprises a pair of mounting sets, 10a and 10b respectively fastened to a fore and aft location of the stores 150. The particular locations of the mounting sets 10a, 10b are such as to be in registry with the stations 176a, 176b of the carrier vehicle when the stores 150 is mounted thereto. The mounting sets 10a and 10b in this embodiment are substantially identical structurally, and will be referred to collectively by the numeral 10, and are located along the casing 156 on opposite axial sides of the centre of gravity CG of the stores 150 for providing a statically balanced configuration when the stores 150 is mounted to the carrier vehicle 170. Accordingly, it is possible for at least one of the mounting sets to be fastened to a different part of the stores 150 away from the casing 156.

Each said mounting set 10 comprises an attachment or mounting bracket 13 in the form of a lug configured for cooperating with hook 178 of the respective mounting station. The particular geometry of the bracket 13 is generally complementary to, and corresponds to, the particular hook geometry onto which it is wished to mount the stores 150 via the mounting system 100. It is to be noted that in applications of the invention in which the mounting stations comprise a different configuration for engaging with stores, the bracket 13 follows the configuration required for enabling engagement with the mounting station.

Figure 4:
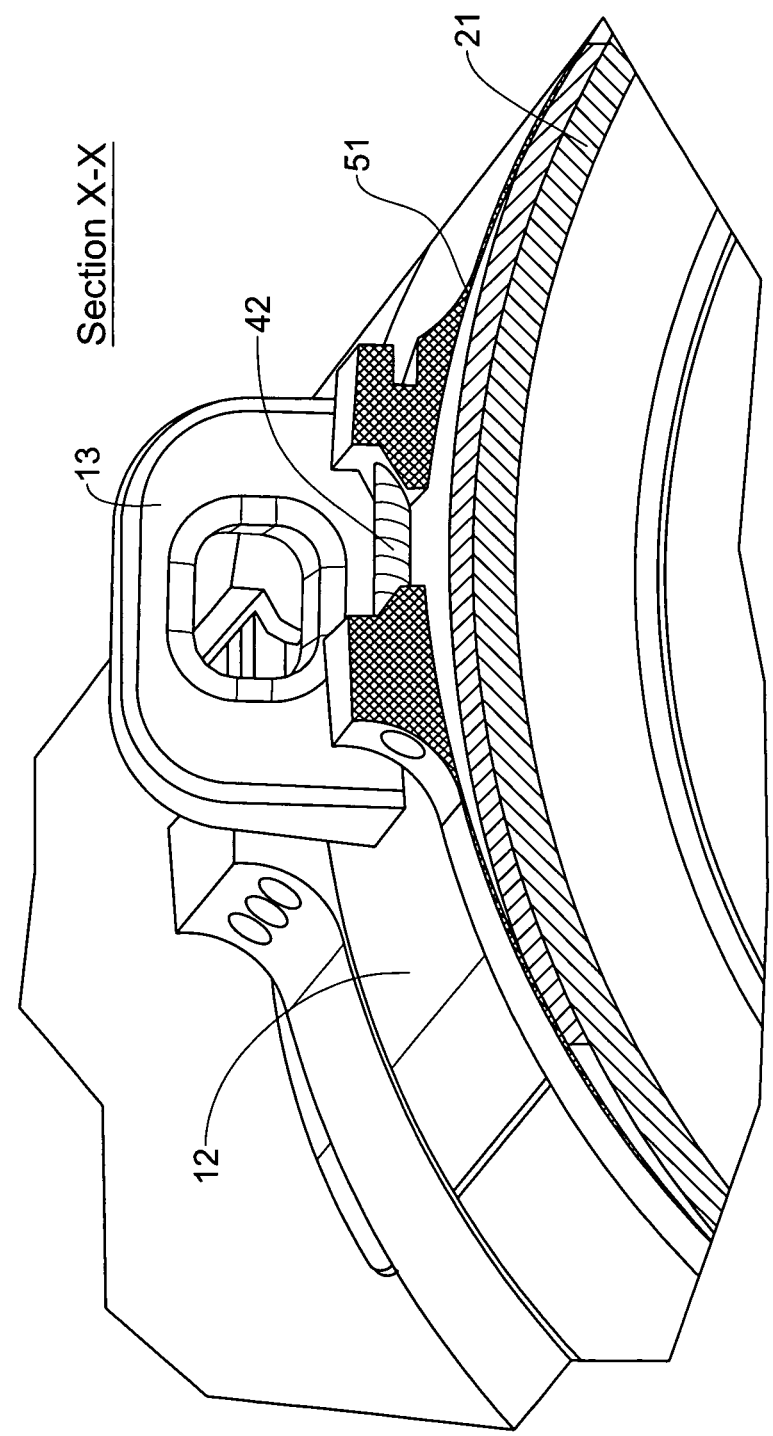
FIG. 4 is a partial cross-sectional top rear isometric view of the embodiment of FIG. 1, the cross-section taken along X-X in FIG. 1.

The bracket 13 is rigidly joined to a base in the form of a generally rigid saddle member 12, either integrally or in any suitable manner, for example welding, bolting and so on, and the bracket 13 projects outwardly from the outer convex side of the saddle member 12. The saddle member 12 acts as a load bearing interface between the bracket 13 and the stores 150. Referring also to FIG. 4, the saddle member 12 comprises a substantially concave surface 21 that is generally complementary to the external surface 159 of the store onto which the saddle member 13 is to be fastened. The thickness and material of the saddle member 12 and bracket 13 are such as to enable loads to be transmitted directly or indirectly between the stores 150 and the mounting stations, while maintaining mechanical integrity of the saddle member 12 and bracket 13. Optionally, a friction inducing coating or layer 17 is provided on said surface 21, for example a thin elastomeric or rubber layer, or the like, optionally glued (or otherwise affixed) to the surface 21. The saddle member 12 comprises a pair of flanges 23a, 23b axially extending in opposite directions from a central portion 24 of the saddle member 12 onto which the bracket 13 is joined.

The saddle member 12 is fastened onto the casing 156 by means of a pair of substantially identical tension straps 14. Each strap 14 comprises a strip 37 of material having a width w, thickness t and length l, and enlarged ends 36, and is configured for being looped around at least a majority of or the full perimeter P, partly in direct load-bearing contact with external surface 159, and partly in indirect contact thereto by being in abutting load bearing contact with a corresponding flange 23a or 23b. Thus, a portion 34 of each strap 14 is in overlying and abutting relationship with a corresponding flange 23a or 23b, and in this embodiment the portion 34 comprises the enlarged ends 36 including a suitable connection arrangement 40 to connect the said ends 36 together such as to enable the strap 14 to circumscribe the perimeter P and maintain a looped configuration with respect thereto. In this embodiment, the connection arrangement is also configured to provide the corresponding strap 14 with a baseline tension $T_0$ for maintaining the saddle securely fastened to the casing 156 for a range of conditions, and thus prevent the strap 14 from loosening over the casing 156, as will be described further herein. The length l is generally determined by the perimeter P of the stores 150, taking into account the effective circumferential length of the connection arrangement 40.

Thus, the mounting set 10 enables the bracket 13 to be fastened to the stores in a bolt-free, rivet free, or weld-free manner with respect to the casing 156, enabling the location of the bracket with respect to the stores to be varied during the fastening operation, and further enabling the mounting set to be removed from the stores without damaging the same.

Figure 3:
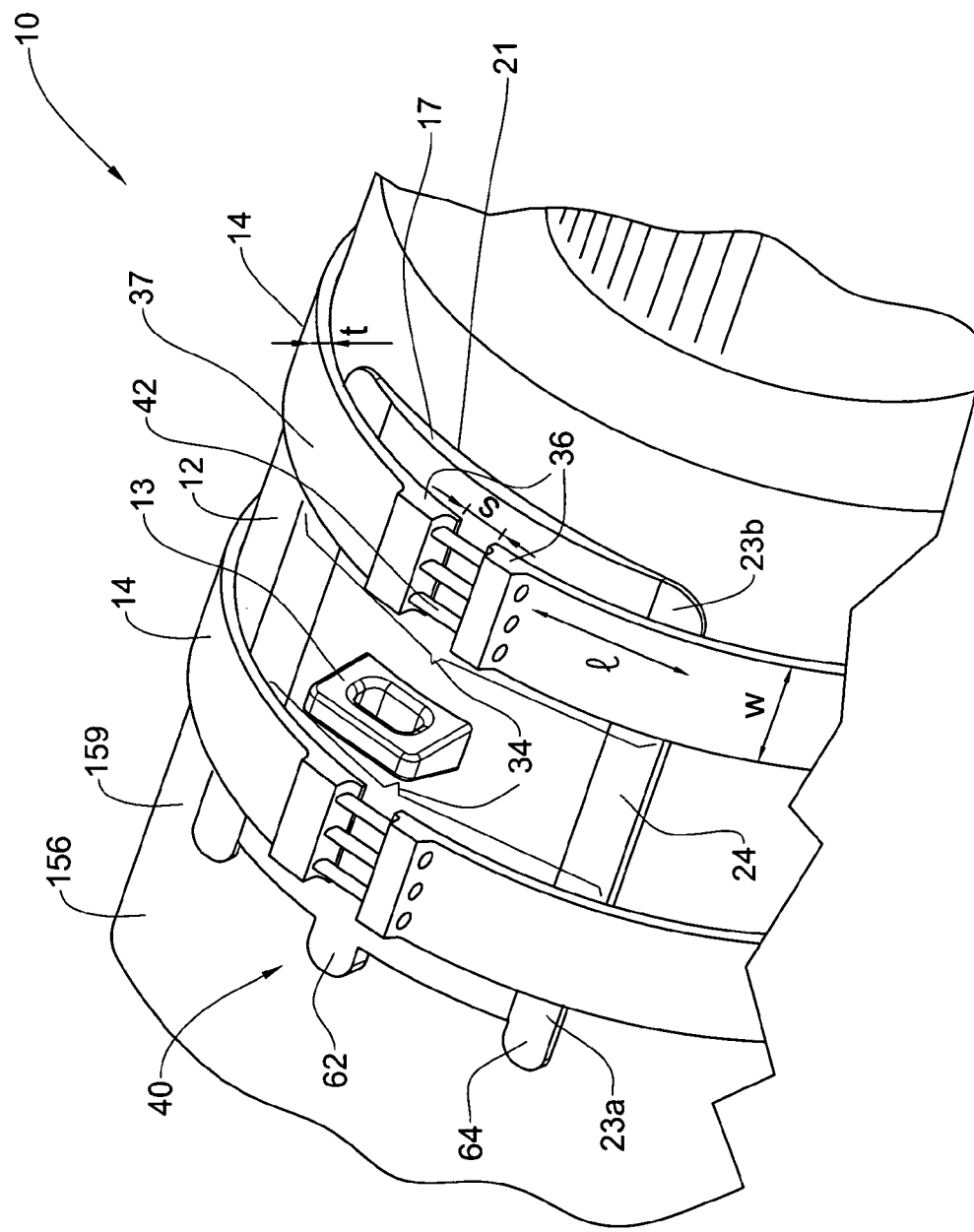
FIG. 3 is a detail of a marked part of FIG. 2.
Figure 3A:
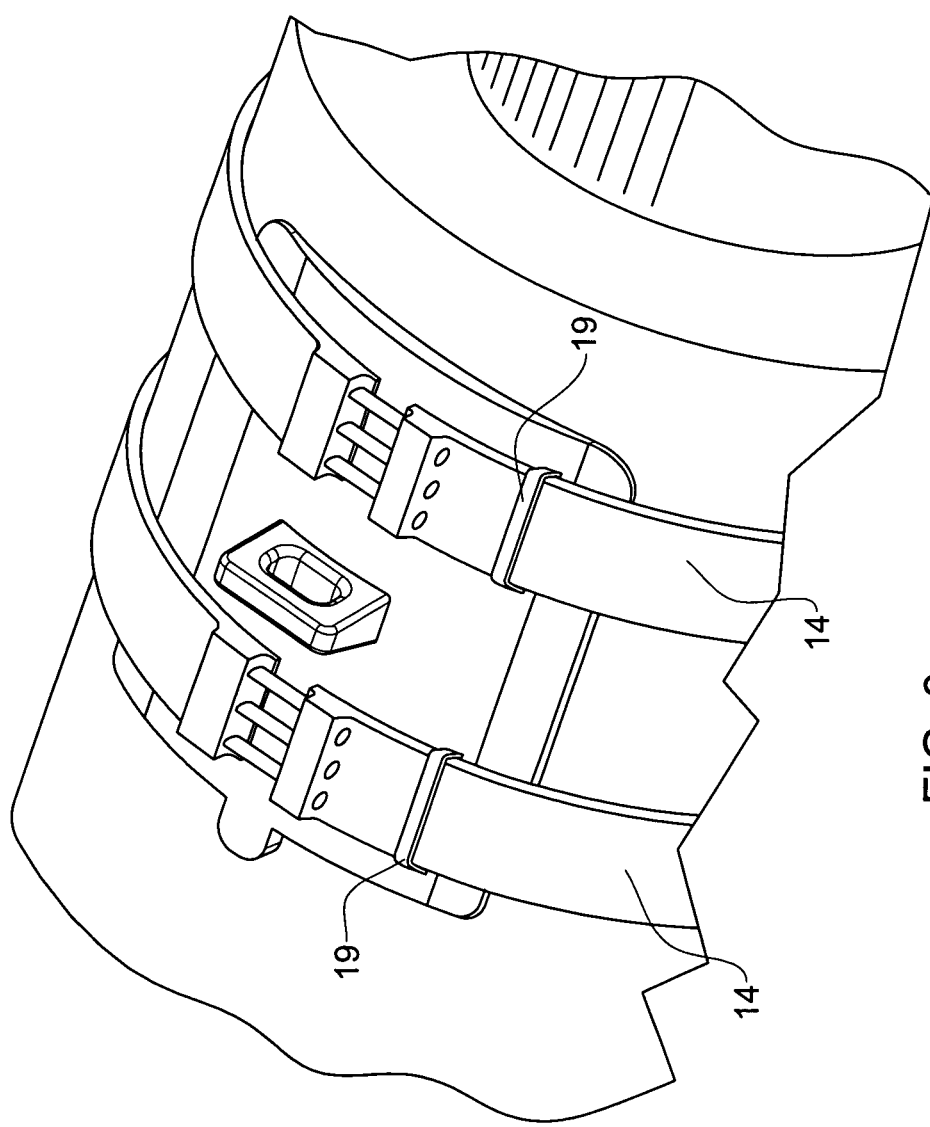
FIG. 3(a) illustrates a variation of the embodiment illustrated in FIG. 3.

Optionally, and as illustrated in FIG. 3(a), one or more loops or carriers 19 may be provided, integrally formed or joined to the saddle member 12, for slidingly holding at least one end of each belt 14 in place with respect to the saddle member 12, and thus facilitating assembly of the mounting set 10 with respect to the stores 150.

The connection arrangement 40 comprises a plurality of tension bolts 42, rivets or the like, that engage the enlarged ends 36 via a corresponding plurality of apertures 43 formed in each end 36. Alternatively, suitable mechanical clamps may be provided for connecting the enlarged ends 36. In the illustrated example, the bolts 42 may be turned until the torque corresponds to baseline tension $T_0$. Alternatively, when rivets are used instead of bolts 42, the length of the rivet may be chosen such as to provide a spacing S between the ends 36 when engaging the two together, this spacing S being such as to provide the baseline tension $T_0$.

Figure 5A:
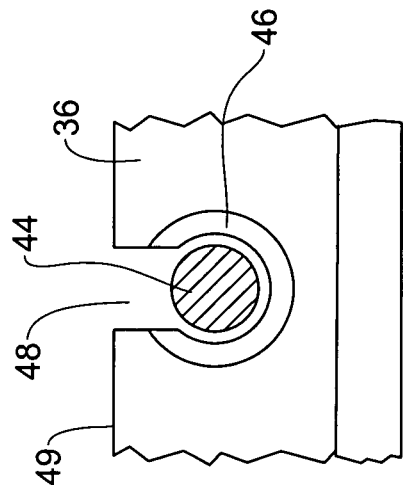
FIG. 5(a) illustrates the embodiment of FIG. 5 along the direction of arrow A.
Figure 5:
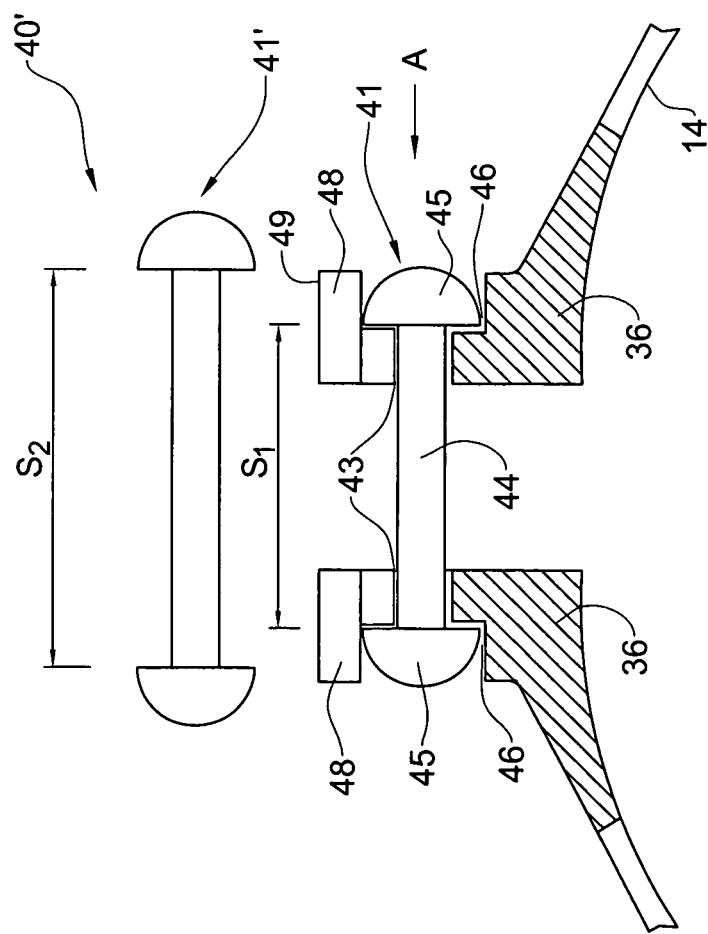
FIG. 5 illustrates in partial cross-sectional view an example of a connection arrangement of the embodiment of FIG. 1.

Alternatively, and referring to FIG. 5 and FIG. 5(a), an alternative connection arrangement 40' is illustrated, comprising, instead of bolts or rivets, a pin arrangement 41 having a central shaft 44 with heads 45 for abutting against complementary shoulders 46 formed in said apertures 43. The in-situ length $S_1$ of the shaft 44 is such that when the pin 41 is in place with the heads 45 in abutment with the shoulders 46, this induces baseline tension $T_0$ in the corresponding strap 14. To facilitate engagement of the heads 45 with the corresponding shoulders 46, through slots 48 having a width at least a little larger than the diameter of the shaft 44, are provided from an upper edge 49 (as seen in FIGS. 5 and 5(a)) to the corresponding aperture 43 to allow the shaft 44 to pass therethrough and settle on the corresponding aligned pair apertures 43 of the facing ends 36.

In one variation of the embodiment of FIGS. 5 and 5(a), the pin 41 is engaged with the ends 36 by forcing the ends 36 together closer together than is required to fit the shaft 44 therebetween, providing a distance between the shoulders 46 less than $S_1$, thereby permitting enough clearance for inserting the pin through the slots 48 and into position with respect to apertures 43. When the ends 36 are released, the heads 45 engage the shoulders 46 and provide the baseline tension $T_0$.

In another variation of the embodiment of FIGS. 5 and 5(a), the connection arrangement comprises a thermal connector, and pin 41 is made from a so-called shape memory alloy (SMA), for example Nitinol (Ti 50%, Ni 50%), CuZnAl, or CuAlNi alloys. The SMA is chosen to have an Austenite finish (Af) temperature less than the lowest operating temperature $Temp_{min}$ of the stores 150. To fit the pin 41 into position with respect to the ends 36, the pin 41 is cooled to a temperature well below the Austenite start (As) temperature, or below this to the Martensite start (Ms) temperature, allowing the pin to be deformed (indicated at 41' in FIG. 5) to a longer shaft length $S_2$, sufficient for the heads 45 to clear the shoulders 46 when the strap 14 is in a non-stressed state. With the deformed pin in place, the pin is heated to the Af temperature, and assumes its original length $S_1$, bringing together the ends 36, and providing the baseline tension $T_0$ to the strap 14.

Alternatively, the straps may each be formed as a closed loop (not illustrated) made from a shape memory alloy (SMA), for example Nitinol (Ti 50%, Ni 50%), CuZnAl, or CuAlNi alloys. The SMA for the strap is chosen to have an Austenite finish (Af) temperature less than the lowest operating temperature $Temp_{min}$ of the stores 150. To fit the strap into position with respect to the casing 150, the strap is cooled to a temperature well below the Austenite start (As) temperature, or below this to the Martensite start (Ms) temperature, allowing the strap to be deformed to a larger diameter, sufficient for the strap to be brought into position overlying the saddle flanges and the casing. With the strap in place, the strap is heated to the Af temperature, and assumes its original diameter, contracting over the saddle and casing such as to provide the baseline tension $T_0$ to the strap.

The inner-facing surface 51 of each strap 14 may be coated or comprise a layer of frictionless or lubricating material, for example based on or comprising Teflon or molybdenum disulphide, such as to minimize or prevent friction or shear forces being induced between the strap 14 and the external surface 159 and/or the corresponding flange 23a or 23b when in load bearing abutment therewith. Thus, in said load bearing abutment, loads can be transmitted between the mounting stations and the stores 150 via the bracket 13, saddle member 12, and optionally the straps 14, without adding unnecessary additional stress to the straps 14 which may otherwise be generated if substantial friction and/or shear is present between the straps 14 and the surface 159 and/or the corresponding flange 23a or 23b. Such additional stress would require the cross-section of the straps 14 to be greater, and/or for the strap material to have a different modulus of elasticity. According to an aspect of the invention, loads components along 99 are not substantially resisted by the straps, but rather primarily via frictional contact between the saddle member and the casing, while radial load components may in addition also be resisted by the straps.

Thus, during operation of the stores 150, while mounted to the vehicle 170 such as an aircraft or other aerospace vehicle, the stores 150 may be subjected to dynamic loads during lift-off as well as during maneuvering. After disconnecting and deploying the stores from the vehicle 170, by disengaging the hooks 178 from the brackets 13, the mounting sets 10 remain fastened on the casing 156. After disconnection and deployment of the stores, and in some case prior thereto, the rocket motor 159 is fired, and the casing is pressurized to a high pressure, and according to an aspect of the invention during operation of the motor 159, or at least while the pressure in the casing 156 is above ambient, the straps 14 deform generally following the elastic strain of the casing 156 in order to prevent stress concentration on the casing 156 by the straps 14. The expansion may vary and at least partially reverse during operation of the motor.

Figure 6:
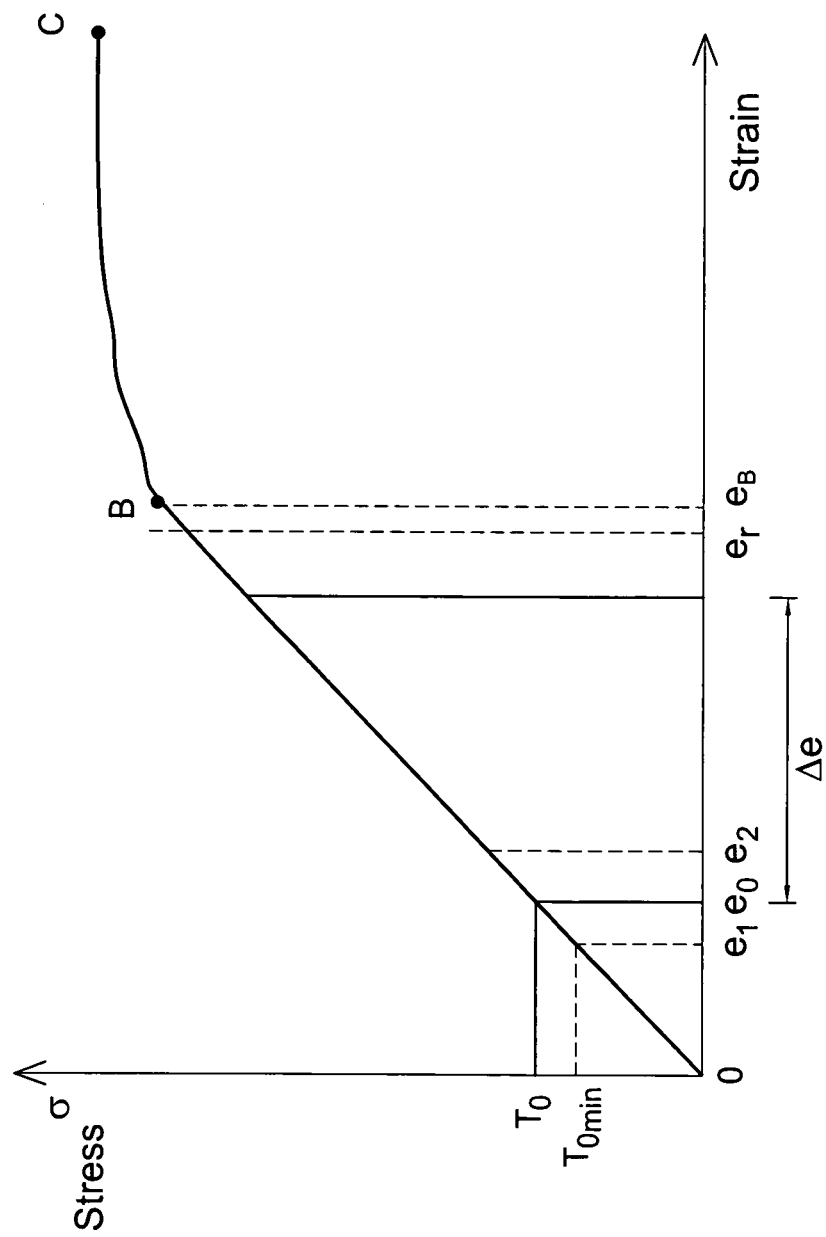
FIG. 6 schematically illustrates an example stress-strain graph for a material for the straps of the embodiment of FIG. 1.

Thus, in this embodiment, the straps 14 are further configured for accommodating the range of expansion of casing 156 undergoes during operation of the rocket motor 159, on the one hand without inducing buckling or bursting stresses on the casing 156, while on the other hand maintaining the saddle member 12 firmly fastened onto the casing 156 for the full range of loading induced by dynamic maneuvers carried out by the carrier vehicle. Such maneuvers may include accelerations and decelerations along any of three orthogonal axes of the aircraft, and/or rotational movements about said axes, pitch roll and yaw. The straps 14 may thus be made from a suitable material having such properties. Referring to FIG. 6, an example stress-strain graph is illustrated showing some of the properties that may be required of the material from which the straps 14 are made. Line OB represents elastic deformation of the strap 14, while line BC represents plastic deformation. The material is capable of providing a baseline elastic strain $\epsilon_0$ corresponding to the baseline tension $T_0$ (for a given strap cross-sectional area) that is sufficient for maintaining the mounting set 10 securely fastened onto the casing 156, for the full range of dynamic loads transferred from the carrier vehicle thereto via the brackets 13. The greater the levels of dynamic load expected to be experienced by the set 100, the larger $T_0$ needs to be. It is also to be noted that the larger the sum of the cross-sectional areas of the straps 14 for a given material, the lower that $\epsilon_0$ needs to be to support a given dynamic load, since the same baseline tension may be provided at a lower stress level. A common value for $\epsilon_0$ may be about 0.3%, but the actual design value for any particular stores may depend on the range of operating temperature, expansion characteristics of the belts and/or of the casing, among other factors. At the same time, there is a potential strain increment $\Delta\epsilon$ wherein the strap 14 may deform elastically. According to an aspect of the invention, a material for the straps 14 may be chosen such as to provide a potential strain increment $\Delta\epsilon$ that is matched to the expected expansion of the casing 156 during operation of the rocket motor 159: for example, if the expected casing expansion is about 0.5%, the material needs to have a potential strain increment $\Delta\epsilon$ over and above the baseline strain $\epsilon_0$ that is needed to provide the baseline tension $T_0$ in the straps, which, if for the sake of example is 0.3% results in a requirement for an elastic strain $\epsilon_r$, and thus an elastic strain limit $\epsilon_B$ of not less than 0.8%. The value of potential strain increment $\Delta\epsilon$ generally depends on the thickness and material of the casing, the rating of the rocket motor, among other factors.

Furthermore, the baseline elastic strain $\epsilon_0$ represents the baseline tension $T_0$ at a nominal operating ambient temperature, say 0° C. According to this aspect of the invention, given an operating temperature expected to be experienced by the straps 14 between a minimum temperature $\text{Temp}_{min}$ and a maximum temperature $\text{Temp}_{max}$, say for example between about −50° C. and about +120° C. (, respectively the material of the straps is still capable of providing the required performance therefor. For example, the corresponding reduction in the baseline tension to $T_{0min}$ at $\text{Temp}_{max}$ as a result of the thermal expansion of the belt 14 relative to the casing 156, which may not expand significantly if made from a composite material and/or has a relatively higher thermal mass than the straps, is still sufficient for maintaining the mounting set 10 securely fastened onto the casing 156, for the full range of dynamic loads transferred from the carrier vehicle thereto via the brackets 13. At the same time, the higher strain $\epsilon_2$ that results at $\text{Temp}_{min}$ due to thermal contraction of the belt 14, when added to the potential strain increment $\Delta\epsilon$ for accommodating the expansion of the casing 156, effectively pushes the requirement for an elastic strain $\epsilon_r$ further towards, but not exceeding the elastic strain limit of $\epsilon_B$. Thus, if by way of example $\epsilon_2$ is about 0.35%, $\epsilon_r$ needs to be 0.85, and thus the elastic limit needs to be not less than 0.85%.

Suitable materials for the straps provide a good combination of good tensile strength and low elastic modulus, and preferably also low thermal expansion coefficient. Such materials may include, by way of example, metal alloys, such as for example, titanium alloys in general, including titanium beta alloys (Ti-β), such as for example Ti-15V-3Cr-3Al-3Sn at an 'annealed' state. The Titanium alloy Ti-15V-3Cr-3Al-3Sn has a low modulus of elasticity (E=7900 Kg/mm$^2$) and a high tension strength, therefore the elastic strain reaches about 1%, for example capable of matching the strain of a casing 156 made from carbon fiber or the like.

Other suitable materials for the straps 14 may include Nickel-Titanium alloys (NITINOL) or other metals that are superelastic and/or have shape memory characteristics, or epoxy carbon or Kevlar fibers, and so on.

The extent of fastening required, i.e. the required baseline tension $T_0$, may be determined according to the dynamic forces which the stores 150 is to be subjected to, herein referred to as design dynamic forces. By way of non-limiting example, a stores 150 having a weight of 1000 Kg and design dynamic forces of 10 g acting thereon parallel to the axis 99, and attached to the dynamic platform 170 via two mounting sets, and thus two brackets 13, the force acting on each bracket is 0.5×(10×1000 Kg)=5,000 Kg.

Assuming the mounting set configuration of FIGS. 1 to 4, each bracket 13 being fastened to the stores 150 by two straps 14 of cross section A (=width w*thickness t), and the friction coefficient between the saddle member 12 and the casing 156 is μ=0.5, which may be achieved by providing, for example, one or more rubber sheets for layer 17, a minimal tension T in each strap 14 is determined as:

$$T = \left(\frac{5000 \text{ Kg}}{\mu = 0.5}\right) \cdot \frac{1}{4} = 2500 \text{ Kg}$$

It may be required that this minimal fastening exists for a strain $\epsilon$ of 0.25% (the value of which generally depending on the modulus of elasticity and the combined cross sectional area of the straps) in the strap, this when the temperature of the strap and casing are at $\text{Temp}_{max}$, noting that a metal strap expands due to heating generally more than a casing made from composite material.

The nominal cross-sectional area A required for the strap 14 may be obtained from the baseline tension $T_0$ and strain $\epsilon_0$ for a given material having a modulus of elasticity E:

$$T_0 = E * \epsilon_0 * A$$

Thus, for the above example where $T_0=2,500$ Kg, $\epsilon_0=0.3\%$ and assuming the straps are made from a Ti-β alloy having E=7900 Kg/mm$^2$, the cross-sectional area for each strap 14 is 105 mm$^2$. Any suitable combination of strap width w and thickness t may be used to provide the required cross-sectional area, for example: thickness 1 mm, width 105 mm; thickness 1.5 mm, width 75 mm. In particular, while the thickness t is generally maintained as thin as possible to reduce drag, the width w may be chosen sufficiently large such that the surface pressure provided by the strap 14 on the casing 156, by means of its contact area therewith (length l*width w) is within the allowable limit to prevent the casing buckling or bursting, particularly when subjected to the expanding forces generated by the rocket motor 159. At the same time, very thin straps may be problematic in maintaining mechanical integrity. Thus, it is appreciated that the straps distribute the stresses over a circumference of the casing. Similarly, the contact surface 21 of the saddle member 12 may be made as large as possible to spread the force transmitted via the corresponding bracket 13 over as large an area as possible of the casing 156, to minimise the possibility of buckling or bursting of the casing 156, while avoiding providing straps that are too thin.

Optionally, and as illustrated in FIG. 3, the saddle member 12 may comprise a primary thrust pad 62 configured for cooperating with the ejection or pyrotechnic piston mechanism that may be comprised at the corresponding mounting station during operation of said piston mechanism. Thus, the relative position of the primary thrust pad 62 with respect to the bracket 13 corresponds to the relative position of the corresponding piston mechanism with respect to the corresponding hook 178.

Further optionally, the saddle member 12 may also comprise secondary thrust pads 64 configured for cooperating with a sway brace mechanism that may be comprised at the corresponding mounting station while said stores is mounted to said mounting station. Thus, the relative positions of the secondary thrust pads 64 with respect to the bracket 13 correspond to the relative positions of the corresponding sway braces with respect to the corresponding hook 178.

Alternatively, the saddle member 12 may be formed with a larger flange 23a that extends axially and optionally circumferentially sufficiently to provide cooperation with the aforesaid piston and sway braces.

While the mounting system 100 according to the first embodiment has been described comprising two mounting sets 10, each having two straps 14, it is to be appreciated that the mounting system may comprise more than two mounting sets, or indeed only one mounting set, generally depending on the mounting configuration available at the dynamic platform, and on the size and weight of the stores 150. Furthermore, each mounting set 10 may comprise more than two straps each, mutatis mutandis.

Figure 7:
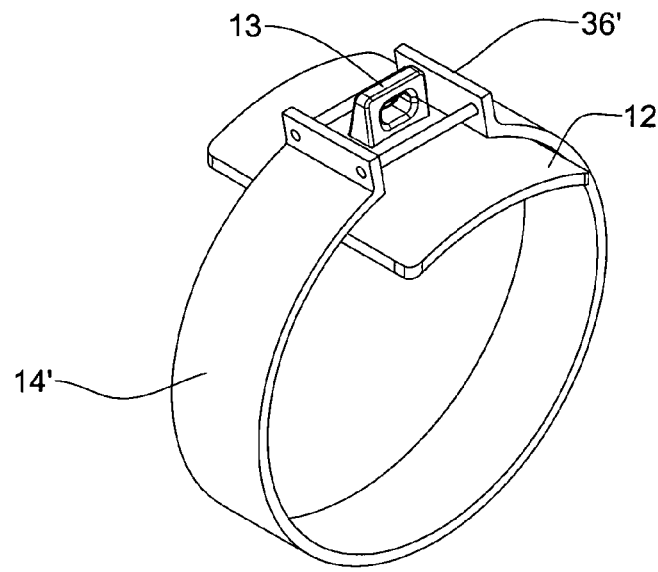
FIG. 7 illustrates in top isometric view a variation of the mounting set embodiment of FIG. 1.

Alternatively, an in a variation of the first embodiment, each mounting set may comprise a single strap, but is otherwise similar to the first embodiment, mutatis mutandis. For example, as illustrated in FIG. 7, the free ends 36' of the illustrated single strap 14' are axially wider than the bracket 13, and are connected to one another by means of bolts, rivets, pins and so on, as described above, mutatis mutandis, but axially displaced from the bracket 13 or in any other manner that does not interfere with the bracket 13 nor with operation of the hook 178. Alternatively, and referring to FIG. 8, in the single strap configuration illustrated, the strap 14" includes two strap arms 14a, 14b extending in opposed directions from a strap ring 14c which includes an opening 14d to allow the bracket 13 to extend therethrough when the ring 14c, and possibly parts of the strap arms 14a, 14b, are in generally frictionless but load bearing contact with saddle member 12. The opening 14d may be made sufficiently large to allow for relative transverse movement between the ring 14c and the saddle member 12 when the bracket 13 is accommodated in the opening 14d. In the embodiment of FIG. 8, the ends 36 of the strap arms 14a, 14b are connected in substantially the same manner as described earlier, mutatis mutandis, with the difference that rather than this connection being made in overlying relationship with the saddle member 12, as is the case there, the connection is made directly over the casing 156 at a different circumferential position with respect thereto, for example at a position diametrically opposed to the position of the bracket 13. Optionally, and as illustrated in FIG. 8(a), a stiffening member 66 may be provided that is engaged between the enlarged ends 36a, 36b of the strap arms 14a, 14b. The stiffening member 66 may be in the form of a metallic tab, rod or the like, for example, that projects from end 36b and is received in a tight fit within a complementary recess in the opposite end 36a, and is configured for minimizing or preventing the ends 36a, 36b from deforming in an outward radial direction when the mounting set is subjected to high stress. Optionally, a load transfer pad 61 may be provided, sandwiched between the ends 36a, 36b and the casing 156, the surface of the pad facing the casing being preferably in frictional, load-bearing engagement with the casing.

Furthermore, it is also to be noted that in other embodiments of the invention, different types/configurations of mounting sets may be employed for use with a particular stores. For example where it is desired to support a stores at the center of gravity, a mounting set designed to carry most of the weight and dynamic stresses of the stores is fastened on the stores at its center of gravity, and one or two lighter duty mounting sets may be provided axially spaced therefrom to provide longitudinal stability. Alternatively, the stores may comprise a cross-section or diameter that varies along its longitudinal length, and different mounting sets with different-length straps may be provided at desired locations.

Figure 9:
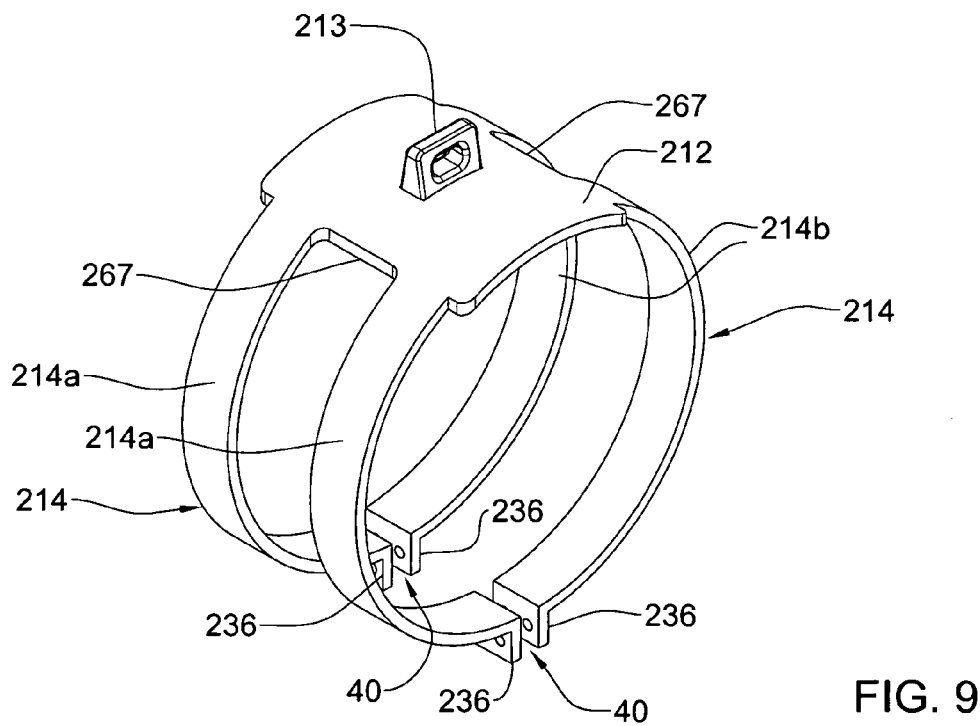
FIG. 9 illustrates in top isometric view a mounting set according to a second embodiment of the invention.

A second embodiment of the invention, illustrated in FIG. 9, comprises all the features and elements of the first embodiment and variations thereof, mutatis mutandis, and thus the mounting set 200 according to this embodiment comprises a bracket 213, saddle member 212, and a pair of straps 214 substantially similar to the bracket, saddle member and straps of the first embodiment, mutatis mutandis. However, in the second embodiment, the straps 214 are not in frictionless overlying relationship with the saddle member 212. Rather, the straps 214 are joined to the saddle member 212, so that the enlarged ends 236 of the straps are joined to one another by the connecting arrangement 40 at a different location. For example, and as illustrated in FIG. 9, the straps 214 each comprise a pair of strap arms 214a, 214b extending from the sides 267 of the saddle member 212, and the enlarged ends 236 of the strap arms 214a, 214b are connected using the connection arrangement 40, and the connection is made directly over the casing 156. Optionally, and in a similar manner to that illustrated in FIG. 8(a) for the variation of the first embodiment, mutatis mutandis, a stiffening member may be provided for each strap 214, engaged between the enlarged ends 236 of the corresponding strap arms 214a, 214b. The stiffening member may be in the form of a metallic tab, rod or the like, for example, that projects from one of the ends 236 and is received in a tight fit within a complementary recess in the other end 236, and is similarly configured for minimizing or preventing the ends 236 from deforming in an outward radial direction when the mounting set is subjected to high stress. Furthermore, and optionally, a load transfer pad may be provided, sandwiched between the ends 236 and the casing 156, the surface of the pad facing the casing being preferably in frictional, load-bearing engagement with the casing. Optionally, the strap arms may be formed integrally with the saddle member. Alternatively the strap arms and the saddle member may be made as separate components welded together, for example, made from different titanium alloys.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed example embodiments in accordance with the invention, it will be appreciated that many changes may be made therein without departing from the spirit of the invention.

The invention claimed is:

1. A mounting set for use in mounting an external stores to a mounting station of an aerospace vehicle, comprising a mounting bracket arrangement and a strap arrangement, said bracket arrangement configured for selective reversible engagement with respect to the mounting station and for cooperating with said strap arrangement, said strap arrangement being configured for securing the bracket arrangement to the external stores in load bearing abutment therewith to enable transfer of loads between the external stores and said mounting station via said bracket arrangement, in operation of said mounting set, wherein said strap arrangement comprises at least one strap configured for circumscribing at least a portion of a perimeter of an external surface of the external stores in abutment with the external surface of the external stores,
    wherein said at least one strap comprises an inner facing surface, and
    wherein said inner-facing surface is coated with or comprises a layer of frictionless or lubricating material to provide friction-free abutment with respect to the external surface of the external stores.

2. A mounting set according to claim 1, said strap arrangement comprising at least one strap configured for circumscribing at least a portion of a perimeter of said external surface of the external stores in abutment therewith.

3. A mounting set according to claim 1, said bracket arrangement comprising a mounting bracket configured for said selective reversible engagement with respect to the mounting station and a base portion configured for said load bearing abutment with the external stores.

4. A mounting set according to claim 2, wherein the or each said strap is configured to provide said friction-free abutment with respect to said external surface.

5. A mounting set according to claim 3, wherein said mounting bracket comprises an attachment lug configured for releasable engagement with a complementary hook member comprised at said mounting station.

6. A mounting set according to claim 3, wherein said base portion is in the form of a saddle member having a contact surface configured for abutting a part of said external surface, the or each bracket being joined to said saddle member.

7. A mounting set according to claim 6, wherein said contact surface is configured for substantial frictional abutment with respect to said external surface.

8. A mounting set according to claim 6, said saddle member comprising at least one saddle flange for allowing overlying abutting connection of the or each said strap with respect therewith such as to sandwich each said saddle flange between said external surface and a corresponding overlying portion of the or each corresponding said strap during operation of said set.

9. A mounting set according to claim 8, wherein said overlying portion of the or each said strap is configured for substantial friction-free abutment with respect to the or each corresponding said saddle flange.

10. A mounting set according to claim 2, each said strap comprising a strip of material having opposite ends, and further comprising a suitable connection arrangement configured for connecting said ends together such as to enable said strap to circumscribe said perimeter.

11. A mounting set according to claim 8, said saddle member comprising two axially spaced said saddle flanges and having said at least one bracket disposed therebetween, and further comprising two said straps, each said strap being in overlying relationship with a respective one of said saddle flanges.

12. A mounting set according to claim 6, said saddle member further comprising a primary thrust pad configured for cooperating with an ejection piston mechanism that may be comprised at the said mounting station during operation of said ejection piston mechanism.

13. A mounting set according to claim 12, wherein said primary thrust pad is in the form of a secondary flange projecting from said saddle flange.

14. A mounting set according to claim 6, said saddle member further comprising a plurality of secondary thrust pads configured for cooperating with a sway brace mechanism that may be comprised at the said mounting station while said external stores is mounted to said mounting station.

15. A mounting set according to claim 2, wherein the or each said straps is configured for elastically deforming to enable accommodation of a variation of said perimeter within a predetermined range while providing said load bearing abutment with the stores.

16. A mounting set according to claim 15, wherein the or each said strap is configured for providing said load bearing abutment with the external stores for a predetermined range of external loading to the external stores via said mounting station, and to further allow said elastic deformation while maintaining said load bearing abutment with the external stores.

17. A mounting set according to claim 15, wherein each said strap is configured for providing said load bearing abutment with the external stores for a predetermined range of thermal loading with respect to the external stores, and to further allow said elastic deformation while maintaining said load bearing abutment with the external stores.

18. A mounting set according to claim 15, wherein the or each said strap comprises a modulus of elasticity such as to provide an elastic deformation of at least 0.8%, while providing a datum loading at an elastic deformation of at least 0.2%, said datum loading being sufficient to provide said load-bearing abutment at said range of external loads.

19. A mounting set according to claim 15, wherein said external loads may be generated by accelerations between about 5 g and about 10 g.

20. A mounting set according to claim 18, wherein the or each said strap is made from any one of: titanium alloys, including Ti-.beta. alloys, Ti-15V-3Cr-3Al-3Sn; composite materials, including carbon fiber composites, aramid fiber composites; superelastic alloys and/or shape memory alloys including Nitinol, CuZnAl, or CuAlNi alloys.

21. A mounting set according to claim 1, wherein said mounting set is particularly configured for the external stores comprising a pressure vessel.

22. A mounting set according to claim 21, wherein said pressure vessel is a rocket motor.

23. A mounting set according to claim 1, wherein said perimeter is substantially circular or oval or any other suitable shape.

24. A mounting set for use in mounting an external stores to a mounting station of an aerospace vehicle, comprising a mount bracket arrangement and a strap arrangement, said bracket arrangement configured for selective reversible engagement with respect to the mounting station and for cooperating with said strap arrangement, said strap arrangement being configured for securing the bracket arrangement to the stores in load bearing abutment therewith to enable transfer of loads between the stores and said mounting station via said bracket arrangement, in operation of said mounting set, wherein the external stores are non-metallic and the strap arrangement is configured for providing a strap deformation that matches a stores deformation of the external stores,
    wherein said external stores comprises a rocket motor,
    wherein said stores deformation is at least one of thermally-induced deformation and pressure-induced deformation responsive to operation of said rocket motor,
    wherein said strap arrangement comprises at least one strap comprising an inner facing surface, and
    wherein said inner-facing surface is coated with or comprises a layer of frictionless or lubricating material to provide friction-free abutment with respect to the external surface of the external stores.

25. A mounting set according to claim 24, said strap arrangement comprising at least one strap configured for circumscribing at least a portion of a perimeter of said external surface of the external stores in abutment therewith.

26. A mounting set according to claim 25 wherein the or each said straps is configured for elastically deforming to provide said strap deformation to enable accommodation of a variation of said perimeter within a predetermined range while providing said load bearing abutment with the stores.

27. A mounting set according to claim 26, wherein the or each said strap is configured for providing said load bearing abutment with the external stores for a predetermined range of external loading to said external stores via said mounting station, and to further allow said elastic deformation while maintaining said load bearing abutment with the external stores.

28. A mounting set according to claim 26, wherein the or each said strap is configured for providing said load bearing abutment with the external stores for a predetermined range of thermal loading with respect to said external stores, and to further allow said elastic deformation while maintaining said load bearing abutment with the external stores.

29. A mounting set according to claim 26, wherein the or each said strap comprises a modulus of elasticity such as to provide an elastic deformation of at least 0.8%, while providing a datum loading at an elastic deformation of at least 0.2%, said datum loading being sufficient to provide said load-bearing abutment at said range of external loads.

30. A mounting set according to claim 26, wherein said external loads may be generated by accelerations between about 5 g and about 10 g.

31. A mounting set according to claim 30, wherein the or each said strap is made from any one of: titanium alloys, including Ti-β alloys, Ti-15V-3Cr-3Al-3Sn; composite materials, including carbon fiber composites, aramid fiber composites; superelastic alloys and/or shape memory alloys including Nitinol, CuZnAl, or CuAlNi alloys.

32. A mounting set according to claim 24, wherein said mounting set is particularly configured for said external stores comprising a pressure vessel.

33. A mounting set according to claim 32, wherein said pressure vessel is a rocket motor.

* * * * *